(12) United States Patent
Lu et al.

(10) Patent No.: US 12,471,142 B2
(45) Date of Patent: Nov. 11, 2025

(54) DATA SENDING METHOD AND DEVICE AND DATA RECEIVING METHOD AND DEVICE

(71) Applicant: ZTE Corporation, Shenzhen (CN)

(72) Inventors: Liuming Lu, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 299 days.

(21) Appl. No.: 17/766,553

(22) PCT Filed: Mar. 9, 2021

(86) PCT No.: PCT/CN2021/079773
§ 371 (c)(1),
(2) Date: Apr. 5, 2022

(87) PCT Pub. No.: WO2021/244090
PCT Pub. Date: Dec. 9, 2021

(65) Prior Publication Data
US 2024/0057160 A1    Feb. 15, 2024

(30) Foreign Application Priority Data
Jun. 1, 2020    (CN) .......................... 202010486017.8

(51) Int. Cl.
*H04W 74/08*    (2024.01)
*H04W 74/0816*    (2024.01)

(52) U.S. Cl.
CPC .............................. *H04W 74/0816* (2013.01)

(58) Field of Classification Search
None
See application file for complete search history.

(56) References Cited

U.S. PATENT DOCUMENTS

| 2011/0176627 A1 | 7/2011 | Wu et al. |
| 2011/0222408 A1 | 9/2011 | Kasslin et al. |
| (Continued) | | |

FOREIGN PATENT DOCUMENTS

| CN | 104168605 A | 11/2014 |
| CN | 105493608 A | 4/2016 |
| (Continued) | | |

OTHER PUBLICATIONS

International Search Report for corresponding application PCT/CN2021/079773 filed Mar. 9, 2021; Mail date Jun. 1, 2021.

(Continued)

*Primary Examiner* — Steve R Young
(74) *Attorney, Agent, or Firm* — CANTOR COLBURN LLP

(57) ABSTRACT

Provided are a data sending method and device and a data receiving method and device. The data sending method includes: sending a notice-to-send message to a second station (STA), where the notice-to-send message is configured to instruct a first STA to prepare to send a data unit to the second STA in a first transmission opportunity (TXOP) obtained in advance, and the second STA belongs to a second multi-link device (MLD); and performing the following operations based on the situation of the third STA receiving a data unit or the notice-to-send message in a duration of a preset inter-frame space: sending a data unit to the second STA in the first TXOP, or stopping sending a data unit to the second STA, where the third STA belongs to a first MLD.

18 Claims, 6 Drawing Sheets

(56) References Cited

U.S. PATENT DOCUMENTS

| | | | |
|---|---|---|---|
| 2018/0049129 A1* | 2/2018 | Li | H04W 52/0235 |
| 2018/0310240 A1 | 10/2018 | Kannan | |
| 2020/0037288 A1 | 1/2020 | Huang et al. | |
| 2021/0076398 A1* | 3/2021 | Naribole | H04W 74/0816 |
| 2021/0360547 A1* | 11/2021 | Wentink | H04W 56/0005 |
| 2022/0132562 A1* | 4/2022 | Yang | H04W 74/04 |
| 2022/0346166 A1* | 10/2022 | Guo | H04W 76/15 |

FOREIGN PATENT DOCUMENTS

| | | | |
|---|---|---|---|
| CN | 106105275 A | 11/2016 | |
| CN | 106851848 A | 6/2017 | |
| CN | 109587052 A | 1/2019 | |
| CN | 109803392 A | 5/2019 | |
| CN | 110418404 A | 11/2019 | |
| CN | 110519862 A | 11/2019 | |
| CN | 110972256 A | 4/2020 | |
| CN | 111066271 A | 4/2020 | |
| JP | 2015536614 A | 12/2015 | |
| WO | 2020032633 A1 | 2/2020 | |
| WO | 2020101807 A2 | 5/2020 | |

OTHER PUBLICATIONS

Chinese Office Action for Chinese Application 202010486017.8 issued on Nov. 29, 2024.
Japanese Office Action for Japanese Patent Application No. 2022-526821; issued on Dec. 3, 2024.
Chinese Search Report; International Application No. 2020104860178; International Filing Date: Jun. 1, 2020; Date of mailing: Mar. 21, 2025; 9 pages.
Jinjing Jiang, "Operation with Non-STR AP" Apple Inc. IEEE 802.11-20/755r1, May 2020, 12 pages.

* cited by examiner

DATA SENDING METHOD AND DEVICE AND DATA RECEIVING METHOD AND DEVICE

CROSS-REFERENCE TO RELATED DISCLOSURE

The present disclosure claims priority to Chinese patent application No. 202010486017.8, filed to the China National Intellectual Property Administration on Jun. 1, 2020, the disclosure of which is hereby incorporated by reference in its entirety.

TECHNICAL FIELD

The embodiments of the present disclosure relate to the field of communications, and in particular to a data sending method and device, and a data receiving method and device.

BACKGROUND

A Wireless Fidelity (WIFI) standard of the next generation requires flexible multi-link operations and the communication technology. FIG. 1 is a schematic diagram of data transmission of a multi-link device provided in the related technology. As shown in FIG. 1, the multi-link device (MLD) has a plurality of accessory stations (STA). In the MLDs, MLD with all accessory stations being wireless access points (AP) is AP MLD, and MLD with all accessory stations being non-APs is non-APMLD. STA in the non-APMLD shown in FIG. 1 can be associated with the corresponding AP in APMLD, and a link formed by STA and the associated AP can have its own corresponding communication channel.

In the WIFI multi-link operation described above, synchronous transmit receive (STR) means that two links of the same MLD can separately transmit and receive data at the same time. In this case, if isolation between communication channels in MLD is not desirable, it will easily lead to in device coexistence (IDC) interference of MLD. To avoid coexistence interference described above, some MLDs do not support the two-link synchronous transmit receive, and the MLD can be defined as a non-STR MLD, that is, the MLD that does not support STR.

For a non-STR MLD, to avoid coexistence interference caused by synchronous data transmit receive on two links of MLD, which will seriously affect device communication, STR should be avoided in multi-link operations. FIG. 2 is a schematic diagram of data transmission of a multi-link device for non-STR provided in the related technology. As shown in FIG. 2, a non-STR MLD cannot support two-link synchronous transmit receive during data transmission. In related technologies, at present, a request to send (RTS) mechanism or a clear to send (CTS) mechanism is mostly used to avoid STR in the a non-STR MLD described above, but the mechanisms described above all have the problems of occupying too many communication resources and low communication efficiency, which lead to inability to effectively avoid STR.

In the related art described above, a non-STR MLD cannot effectively avoid the occurrence of STR during the multi-link operation, which has not been solved by an effective solution in the related art.

SUMMARY

An embodiment of the present disclosure provides a data sending method and device and a data receiving method and device, so as to solve at least the problem that in the related technology, a multi-link device (MLD) for non-synchronous transmit receive (STR) cannot effectively avoid STR during multi-link operations.

According to an embodiment of the present disclosure, a data sending method is provided, which is applied to a first station (STA). The first STA belongs to a first MLD. The method includes:

sending a notice-to-send message to a second STA, where the notice-to-send message is used to instruct that the first STA is prepared to send a data unit to the second STA in a first transmission opportunity (TXOP) obtained in advance, and the second STA belongs to a second MLD; and performing the following operations based on the situation of the third STA receiving a data unit or the notice-to-send message in a duration of a preset inter-frame space: sending a data unit to the second STA in the first TXOP, or stopping sending a data unit to the second STA, wherein the third STA belongs to the first MLD.

According to another embodiment of the present disclosure, there is further provided a data receiving method, which is applied to a second STA. The second STA belongs to a second MLD. The method includes:

receiving a notice-to-send message sent from a first STA, where the notice-to-send message is used to instruct that the first STA is prepared to send data to the second STA in a first TXOP obtained in advance, and the first STA belongs to a first MLD; and receiving a data unit sent from the first STA in the first TXOP in the case that the third STA receives a data unit or the notice-to-send message in a duration of a preset inter-frame space, where the third STA belongs to the first MLD.

According to another embodiment of the present disclosure, there is further provided a data sending device, which is applied to a first STA. The first STA belongs to a first MLD. The device includes:

a first sending module configured to send a notice-to-send message to a second STA, where the notice-to-send message is used to instruct that the first STA is prepared to send a data unit to the second STA in a first TXOP obtained in advance, and the second STA belongs to a second MLD; and a second sending module configured to perform the following operations based on the situation of the third STA receiving a data unit or the notice-to-send message in a duration of a preset inter-frame space: sending a data unit to the second STA in the first TXOP, or stopping sending a data unit to the second STA, wherein the third STA belongs to the first MLD.

According to another embodiment of the present disclosure, there is further provided a data receiving device, which is applied to a second STA. The second STA belongs to a second MLD. The device includes:

a first receiving module configured to receive a notice-to-send message sent from a first STA, where the notice-to-send message is used to instruct that the first STA is prepared to send data to the second STA in a first TXOP obtained in advance, and the first STA belongs to a first MLD; and a second receiving module configured to receive a data unit sent from the first STA in the first TXOP in the case that the third STA receives a data unit or the notice-to-send message in a duration of a preset inter-frame space, where the third STA belongs to the first MLD.

According to another embodiment of the present disclosure, there is further provided a computer readable storage medium, which stores a computer program, where the computer program is configured to execute the steps of any one of the method embodiments described above at runtime.

According to another embodiment of the present disclosure, there is further provided an electronic device, which includes a memory and a processor, where the memory stores a computer program, and the processor is configured to run the computer program to execute the steps of any one of the method embodiments described above.

DETAILED DESCRIPTION OF THE EMBODIMENTS

Figure 1:
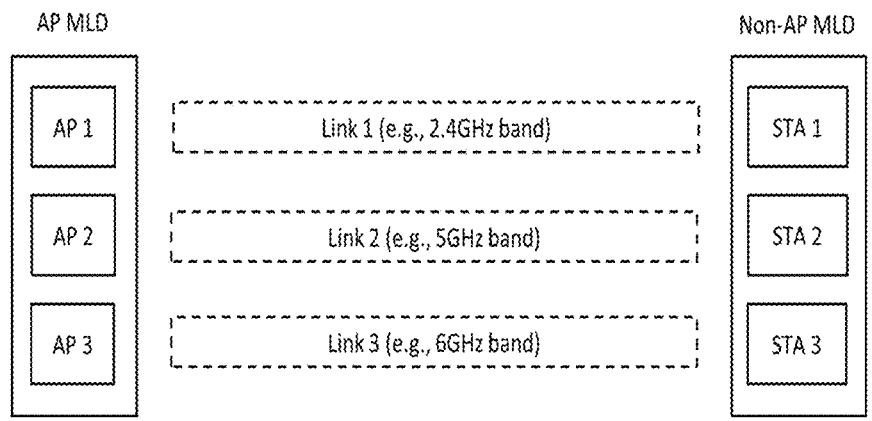
FIG. 1 is a schematic diagram of data transmission of a multi-link device provided in the related technology.
Figure 2:
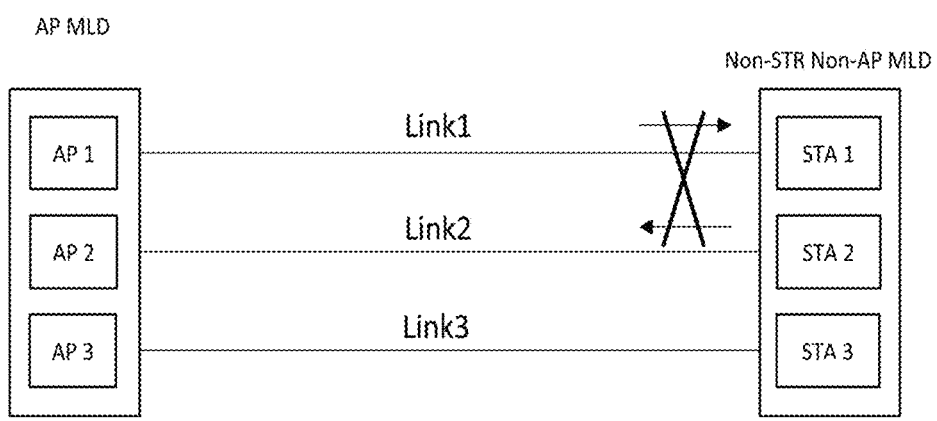
FIG. 2 is a schematic diagram of data transmission of a non-synchronous transmit receive (STR) multi-link device provided in the related technology.

The embodiments of the present disclosure will be described in detail below with reference to the accompanying drawings in conjunction with embodiments.

It should be noted that the terms "first", "second", etc., in the description and claims of the present disclosure and in the drawings described above, are used to distinguish between similar objects and not necessarily to describe a particular order or sequential order.

Figure 3:
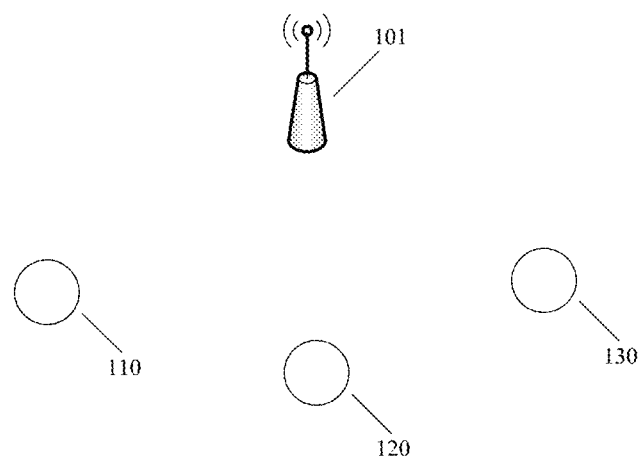
FIG. 3 is a schematic diagram of a framework of data transmission provided in an embodiment of the present disclosure.

To further describe working modes of a data sending method and device and a data receiving method and device in embodiments of the present disclosure, application scenes of the data sending method and device and the data receiving method and device in the embodiments of the present disclosure are described as follows:

The embodiments of the present disclosure may be applied to data transmission among a plurality of multi-link devices (MLD). FIG. 3 is a schematic diagram of a framework of data transmission provided in an embodiment of the present disclosure. As shown in FIG. 3, a system framework of the embodiments of the present disclosure includes at least one network device 101, as well as a plurality of communication devices 110, 120 and 130, and each of the communication devices 110, 120 and 130 may be MLD. The network device 101 is configured to provide network services for the communication devices 110, 120 and 130, so that any two of the communication devices 110, 120 and 130 may transmit data to each other. In a case that any one of any two communication devices, which transmit data to each other, in the communication devices 110, 120 and 130 is MLD for non-synchronous transmit receive (STR), a sending side and a receiving side in a data transmission process may constitute a first MLD and a second MLD in the embodiments of the present disclosure.

Figure 4:
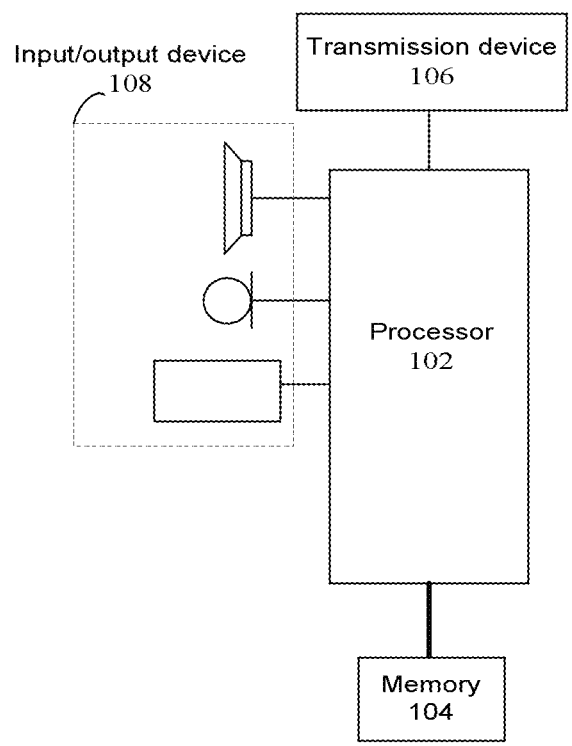
FIG. 4 is a structure block diagram of hardware of a mobile terminal for implementing a data sending method of an embodiment of the present disclosure.

The data sending method provided in the embodiments of the present disclosure may be performed in any station (STA) in MLD, such as a mobile terminal, a computer terminal or a similar computing device. Running on a mobile terminal is taken as an example. FIG. 4 is a structure block diagram of hardware of a mobile terminal for implementing a data sending method of an embodiment of the present disclosure. As shown in FIG. 4, the mobile terminal may include one or more (only one is shown in FIG. 1) processors 102 (the processors 102 may include but not limited to processing devices such as a microcontroller unit (MCU) or a field programmable gate array (FPGA)) and a memory 104 configured to store data, where the mobile terminal may further include a transmission device 106 configured to have a communication function and an input/output device 108. Those skilled in the art may understand that a structure shown in FIG. 4 is only schematic, and does not limit a structure of the mobile terminal. For example, the mobile terminal may further include more or fewer assemblies than that shown in FIG. 4, or have a different configuration from that shown in FIG. 4.

The memory 104 may be configured to store a computer program such as a software program and module of application software, for example, a computer program corresponding to the data sending method in the embodiments of the present disclosure, and the processor 102 executes various functional applications and data processing by running the computer program stored in the memory 104, that is, the method is realized. The memory 104 may include a high-speed random access memory, and may further include a non-volatile memory, for example, one or more magnetic storage devices, flash memories, or other non-volatile solid-state memories. In some examples, the memory 104 may further include a memory remotely arranged with respect to the processor 102, and the remote memories may be connected with the mobile terminal by means of a network. Examples of networks described above include, but not limited to, the Internet, enterprise intranets, local area networks, mobile communication networks, and combinations thereof.

The transmission device 106 is configured to receive or send data by means of one network. Specific examples of the network described above may include a wireless network provided by a communication provider of the mobile terminal. In an example, the transmission device 106 includes a network interface controller (NIC), which may be connected with other network devices by means of a base station so as to communicate with the Internet. In an example, the transmission device 106 may be a radio frequency (RF) module, which is configured to communicate wirelessly with the Internet.

Figure 5:
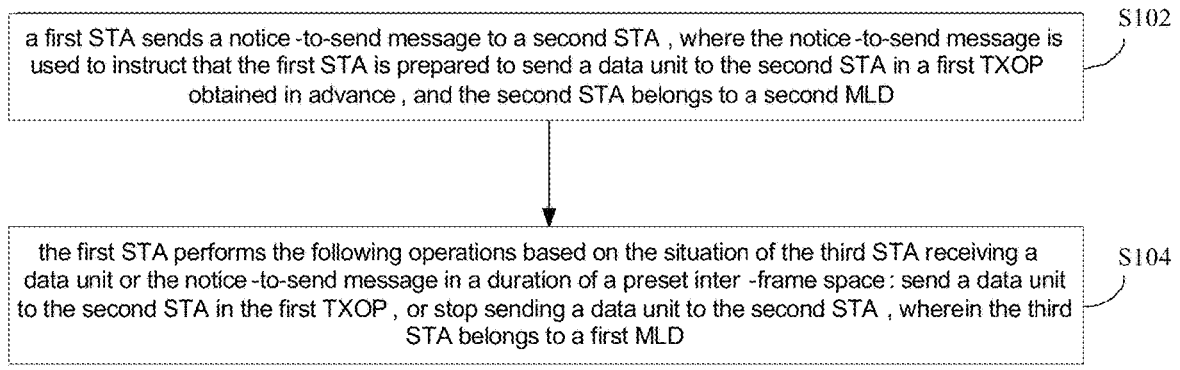
FIG. 5 is a flow diagram of a data sending method provided in an embodiment of the present disclosure.

The working modes of the data sending method and device and the data receiving method and device in the embodiments of the present disclosure are described as follows:

According to some embodiments of the present disclosure, there is provided the data sending method, which is applied to a first STA. The first STA belongs to a first MLD. FIG. 5 is a flow diagram of the data sending method provided in an embodiment of the present disclosure. As shown in FIG. 5, the data sending method in the embodiment includes the following steps:

S102, the first STA sends a notice-to-send message to a second STA, where the notice-to-send message is used to instruct that the first STA is prepared to send a data unit to the second STA in a first transmission opportunity (TXOP) obtained in advance, and the second STA belongs to a second MLD; and S104, the first STA performs the following operations based on the situation of the third STA receiving a data unit or the notice-to-send message in a duration of a preset inter-frame space: a data unit is sent to the second STA in the first TXOP, or a data unit is stopped being sent to the second STA, wherein the third STA belongs to the first MLD.

It should be noted that in the embodiments of the present disclosure, the first STA and the third STA both belong to the first MLD. The first STA is an STA for conducting data transmission in advance in the first MLD, there may be one or more third STAs, and the third STA is an STA other than the first STA in the first MLD. Similarly, in the embodiments of the present disclosure, the second STA and the fourth STA both belong to the second MLD. The second STA is an STA for conducting data transmission in advance in the second MLD, there may be one or more fourth STAs, and the fourth STA is an STA other than the second STA in the second MLD.

It should be noted that at least one of the first MLD and the second MLD is a non-STR MLD, that is, the first MLD may be an STR MLD while the second MLD may be a non-STR MLD, or the first MLD may be a non-STR MLD while the second MLD may be an STR MLD, or each of the first MLD and the second MLD may be a non-STR MLD, which is not limited in the embodiments of the present disclosure.

According to the embodiments of the present disclosure, since the first STA belonging to the first MLD may send a notice-to-send message to the second STA belonging to the second MLD, so as to instruct the first STA to prepare to send a data unit to the second STA in the first TXOP obtained in advance, and then the first STA may perform the following operations in the case that the third STA belonging to the first MLD receives a data unit or the notice-to-send message in a duration of a preset inter-frame space: a data unit is sent to the second STA in the first TXOP, or the data unit is stopped being sent to the second STA. Therefore, the embodiments of the present disclosure may solve the problem that in the related technology, a non-STR MLD cannot effectively avoid STR during multi-link operations, so as to avoid STR during data transmission between the first MLD and the second MLD.

In the embodiments of the present disclosure, the first STA may conduct contention in advance to obtain the first TXOP, so as to transmit data to the second STA. After obtaining the first TXOP, before sending a data unit to the second STA, the first STA may send a notice-to-send message to the second STA to instruct the first STA and the second STA to transmit the data unit in the first TXOP, and the second MLD that the second STA belongs to may control other STAs belonging to the second MLD according to a content of the notice-to-send message. In an embodiment, after the first STA sends a notice-to-send message to the second STA, the second STA may transmit the notice-to-send message to a management entity of the second MLD, so as to allow the management entity of the second MLD to instruct, according to the notice-to-send message, the fourth STA to stop sending a data unit to the first STA and/or the third STA in a preset duration, where the fourth STA belongs to the second MLD, and the preset duration is used to instruct a period corresponding to the first TXOP duration.

Therefore, before sending a data unit to the second STA, the first STA may determine whether to send a data unit to the second STA in the first TXOP or choose to stop sending the data unit to the second STA in the case that other STAs in the first MLD receive a data unit or a notice-to-send message in a duration of a preset inter-frame space. In an example, in a case that other STAs in the first MLD do not receive a data unit or a notice-to-send message in a duration of a preset inter-frame space, the first STA sends data to the second STA in the first TXOP; and in a case that other STAs in the first MLD receive a data unit or the notice-to-send message in the preset inter-frame space, the first STA stops sending a data unit to the second STA. Therefore, in a process of the first STA sending data to the second STA in the first TXOP, it may be ensured that there is no data transmission in other links between the first MLD and the second MLD, so as to avoid STR between the first MLD and the second MLD.

In an embodiment, the step that the first STA performs the following operations based on the situation of the third STA receiving a data unit or the notice-to-send message in a duration of a preset inter-frame space: a data unit is sent to the second STA in the first TXOP, or a data unit is stopped being sent to the second STA, includes the following steps:

the first STA sends data to the second STA in the first TXOP in a case that the first MLD is a non-STR MLD, the second MLD is an STR MLD, and the third STA does not receive a data unit or a notice-to-send message, a target address of which is the third STA, in the duration of the inter-frame space; or, the first STA sends data to the second STA in the first TXOP in a case that the first MLD is an STR MLD, the second MLD is a non-STR MLD, and the third STA does not receive a data unit or a notice-to-send message sent from a fourth STA in the duration of the inter-frame space, where the fourth STA belongs to the second MLD; or, the first STA sends data to the second STA in the first TXOP in a case that the first MLD is a non-STR MLD, the second MLD is a non-STR MLD, and the following conditions are met:

the third STA does not receive a data unit or a notice-to-send message, a target address of which is the third STA, in the duration of the inter-frame space, and the third STA does not receive a data unit or a notice-to-send message sent from the fourth STA in the duration of the inter-frame space.

In an embodiment, the step that the following operations are performed based on the situation of the third STA receiving a data unit or the notice-to-send message in a duration of a preset inter-frame space: a data unit is sent to the second STA in the first TXOP, or a data unit is stopped being sent to the second STA, further includes the following steps:

the first STA stops sending a data unit to the second STA in a case that the first MLD is a non-STR MLD, and the third STA receives a data unit or a notice-to-send message, a target address of which is the third STA, in the duration of the inter-frame space, and/or, the first STA resends the notice-to-send message to the second STA after the third STA returns an acknowledgement (ACK) frame; or, the first STA stops sending a data unit to the second STA in a case that the second MLD is a non-STR MLD, and the third STA receives a data unit or a notice-to-send message sent from the fourth STA in the duration of the inter-frame space, and/or, the first STA resends the notice-to-send message to the second STA after the third STA returns an ACK frame.

It should be noted that in the preset inter-frame space, the third STA may further receive a data unit or a notice-to-send message sent from STA in MLDs other than the second MLD, such as third MLD. In this case, the first STA may send a data unit to the second STA in the first TXOP, and STR cannot be generated.

In an embodiment, in a process that a management entity of a second MLD instructs, according to a notice-to-send message, a fourth STA to stop sending a data unit to the first STA and/or the third STA in a preset duration, in a case that the fourth STA is sending a data unit to the first STA and/or the third STA in a second TXOP, the management entity of the second MLD instructs the fourth STA to perform the following operations:

a current data unit is sent to the first STA and/or the third STA, and a block acknowledgement (BA) frame returned from the first STA and/or the third STA according to the data unit is received; and data is stopped being sent to the first STA and/or the third STA until an end of the first TXOP in a case that the second TXOP is not ended; or data is stopped being sent to the first STA and/or the third STA in a preset idle duration, where the idle duration is longer than or equal to a short inter-frame space (SIFS) in data being sent from the fourth STA.

To enable a notice-to-send message to instruct a first STA to prepare to send data to a second STA in a first TXOP and control a communication resource occupied by the notice-to-send message at the same time, the notice-to-send message includes at least one of the following:

a media access control (MAC) address of the first STA, an MAC address of the second STA, a frame type of the notice-to-send message, a first TXOP duration, a frame check sequence and STR instruction information of the first MLD, wherein the STR instruction information of the first MLD is used to instruct whether the first MLD is an STR MLD or not.

Figure 6:
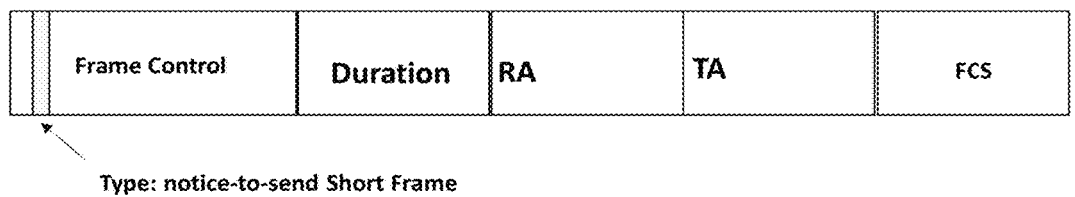
FIG. 6 is a schematic diagram of a frame structure of a notice-to-send message provided in an embodiment of the present disclosure.

FIG. 6 is a schematic diagram of a frame structure of a notice-to-send message provided in an embodiment of the present disclosure. As shown in FIG. 6, the notice-to-send message may be composed of a Type field, frame control, a duration, a sending address, a receiving address and a frame check sequence. It should be noted that in the frame structure of the notice-to-send message shown in FIG. 6, the frame type of the notice-to-send message is carried in the Type, the duration instructs the first TXOP duration, the sending address instructs the MAC address of the first STA, and the receiving address instructs the MAC address of the second STA. The STR instruction information of the first MLD or other information to be carried may be expanded on the frame structure shown in FIG. 6, which is not be described in detail in the embodiments of the present disclosure.

In an embodiment, the first TXOP duration includes at least one of the following:

a duration for the first STA to send the notice-to-send message to the second STA; a short frame inter-frame space (SF-IFS) duration; a duration for the first STA to send a data unit to the second STA; an SIFS after the data unit sent from the first STA; and a sending duration of an ACK packet instructing a data packet receiving and sending situation, wherein the SF-IFS is used to instruct the inter-frame space.

In an example, the first TXOP duration is the sum of the duration for the first STA to send the notice-to-send message to the second STA, the SF-IFS, the duration for the first STA to send a data unit to the second STA, the SIFS after the data unit sent from the first STA, and the sending duration of an ACK packet instructing a data packet receiving and sending situation.

In an embodiment, the SF-IFS is determined according to the following objects:

a sending duration of a notice-to-send message between two STAs with a largest distance allowed, and a duration of processing the notice-to-send message by a MLD.

In an example, the SF-IFS is determined according to the sum of two times of the sending duration of the notice-to-send message between two STAs with a largest distance allowed, and a duration of processing the notice-to-send message by an MLD (such as the second MLD).

In an embodiment, the step that the notice-to-send message is sent to the second STA includes the following steps:

the notice-to-send message is sent to the second STA according to a modulation and coding scheme (MCS) with a modulation order less than or equal to a preset modulation order threshold; and/or the notice-to-send message is sent to the second STA by means of a subcarrier band with anti-interference performance higher than or equal to a preset anti-interference threshold and/or a signal-to-noise ratio (SNR) larger than or equal to a preset SNR threshold.

According to the technical solution described in the embodiments described above, robustness of the notice-to-send message in a sending process may be ensured to avoid frame loss during transmission.

The data sending method in the embodiments of the present disclosure may be further described according to a plurality of exemplary embodiments as follows:

Exemplary Embodiment 1

Figure 7:
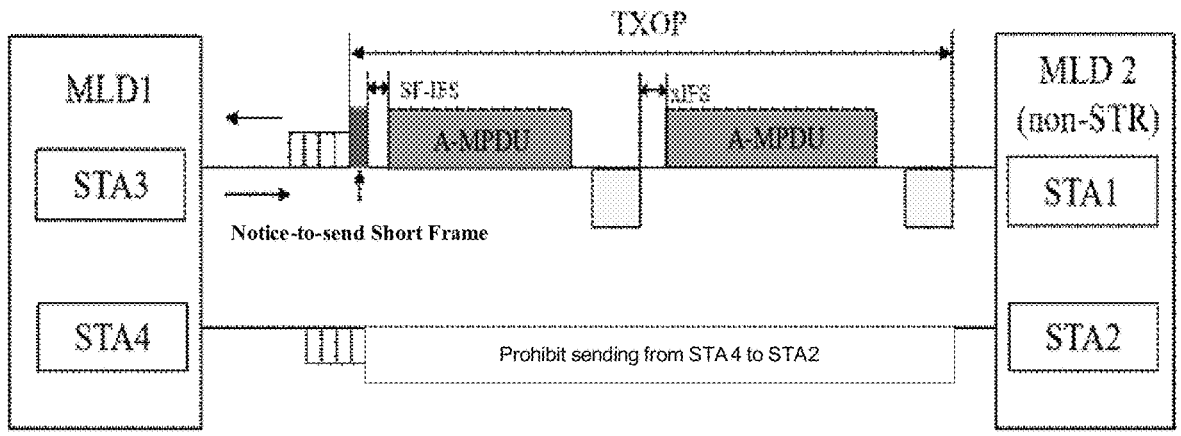
FIG. 7 is a schematic diagram (I) of a scene of data transmission provided in an exemplary embodiment of the present disclosure.

In the exemplary embodiment, MLD2 of a sending side is a non-STR MLD, and MLD1 of a receiving side is MLD1 for STR. FIG. 7 is a schematic diagram (I) of a scene of data transmission provided in an exemplary embodiment of the present disclosure. As shown in FIG. 7, a process of data transmission in a scene shown in the exemplary embodiment is specifically as follows:

When STA1 of MLD2 obtains TXOP, and other STAs (such as STA2) that have non-STR constraints on STA1 in MLD2 are not receiving data or a notice-to-send short frame or a clear-to-send (CTS) frame, a target address of which is the STAs themselves, the STAs prepare to send data to a corresponding STA (set as STA3) in MLD1. To avoid STR in MLD2, it is necessary to send the notice-to-send short frame, which is the notice-to-send message in the embodiments of the present disclosure, to STA3, ask MLD1 to send data to STA3 and indicate a duration of sending TXOP, which is obtained by STA1.

After STA3 receives a notice-to-send short frame sent from STA1, if other STAs (such as STA4) in MLD1 no longer send data to STA (such as STA2) that has a non-STR constraint with an "STA1-STA3" link in MLD2, then MLD1 instructs STA4 not to send data to STA2 at a next TXOP moment. Specifically, the method may include the following steps that STA3 may inform a management entity of MLD1 that "STA1 of a link corresponding to STA3 will send data", the management entity of MLD1 knows that STA1 belongs to a non-STR MLD, and STA4 is instructed to conduct related operations; and in the case that STA4 is sending data to STA2 of MLD2, after an aggregate MAC protocol data unit (A-MPDU) is sent and BA of STA2 is received, if a sending TXOP of STA4 is still not over, data may be stopped being sent to STA2 until a sending TXOP of STA1 is over, or data may be sent to STA2 of MLD2 only after idle time longer than an x inter-frame space (xIFS). The xIFS is configured to instruct an inter-frame space between an end of an originally received BA frame and a frame starting to send A-MPDU, which is an SIFS of data that STA4 is sending to STA2.

In SF-IFS after MLD2 sends a notice-to-send short frame, after other STAs (such as STA2) that have non-STR constraints on STA1 in MLD2 do not receive the data sent to the STAs themselves, STA1 sends data (A-MPDU) to STA3; if STA1 still sends data to STA3 in next time in TXOP, then it is unnecessary to send a notice-to-send short frame; and if STA further sends data to STAs of other MLDs in next time in TXOP, then it is necessary to send the notice-to-send short frame to a corresponding target station first.

Figure 8:
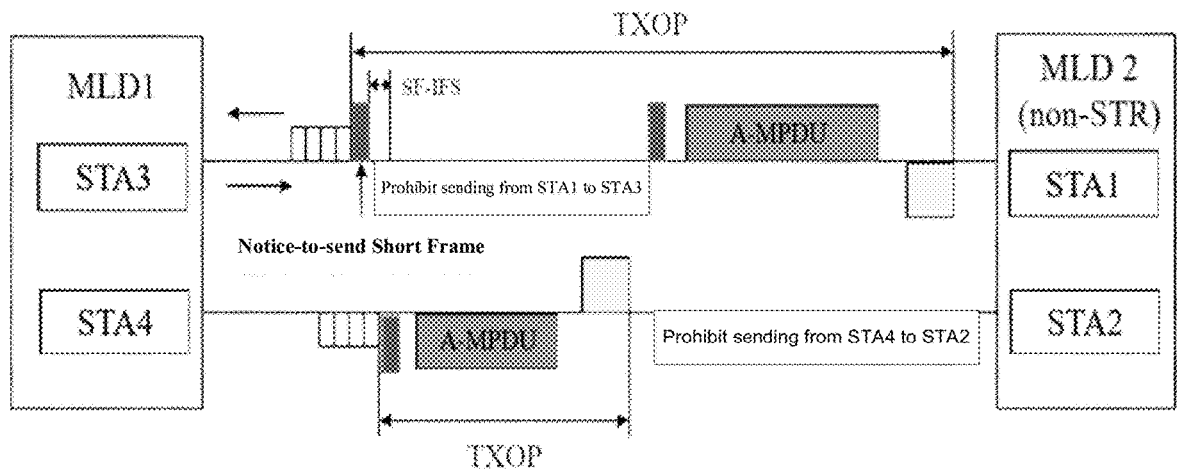
FIG. 8 is a schematic diagram (II) of a scene of data transmission provided in an exemplary embodiment of the present disclosure.

In the SF-IFS after MLD2 sends the notice-to-send short frame, other STAs (such as STA2) that have non-STR constraints on STA1 in MLD2 are receiving data, a target address of which is the STAs themselves, or a notice-to-send short frame, or a CTS frame, and STA1 stops sending data (A-MPDU) to STA3 until STA2 sends a BA frame. FIG. 8 is a schematic diagram (II) of a scene of data transmission provided in an exemplary embodiment of the present disclosure. As shown in FIG. 8, after STA2 sends a BA frame, STA1 sends a notice-to-send short frame.

Exemplary Embodiment 2

Figure 9:
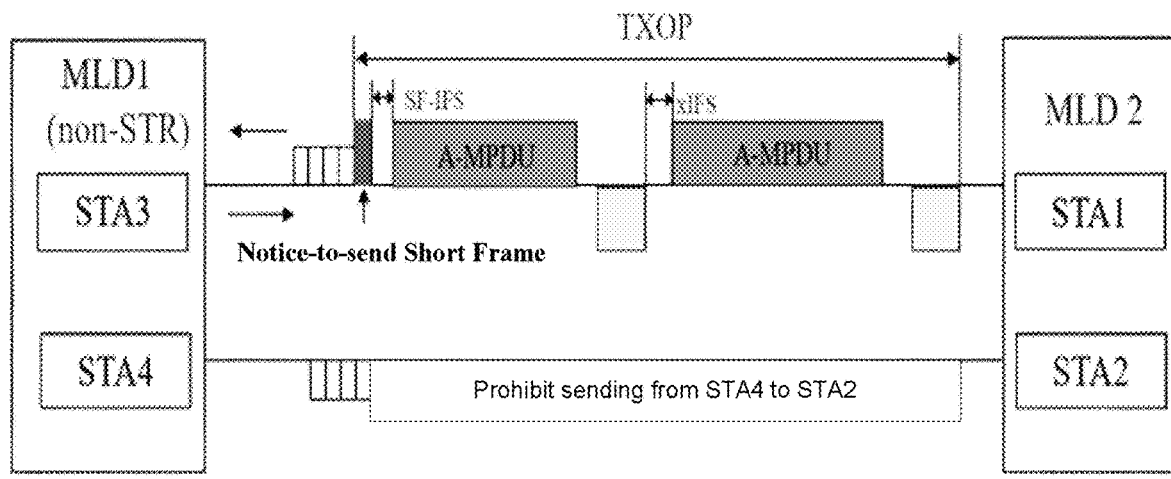
FIG. 9 is a schematic diagram (III) of a scene of data transmission provided in an exemplary embodiment of the present disclosure.

In the exemplary embodiment, MLD of a sending side is MLD2 for STR, and MLD of a receiving side is a non-STR MLD. FIG. 9 is a schematic diagram (III) of a scene of data transmission provided in an exemplary embodiment of the present disclosure. As shown in FIG. 9, a process of data transmission in a scene shown in the exemplary embodiment is specifically as follows:

When a TXOP is obtained, STA1 of MLD2 prepares to send data to a corresponding STA (set as STA3) in a non-STR MLD. To avoid STR in MLD1, it is necessary to send a notice-to-send short frame to STA3, ask MLD1 to send data to STA3 and indicate a duration of sending TXOP, which is obtained by STA1.

After STA3 receives a notice-to-send short frame sent from STA1, MLD1 instructs STA4 not to send data at a next TXOP moment in a case that one or more STAs (such as STA4) that have non-STR constraints on an "STA1-STA3" link in MLD1 are not sending data to other STAs (including STA2 in MLD2). Specifically, the method may include the following steps that STA3 may inform a management entity of MLD1 that "STA1 of a link corresponding to STA3 will send data", and the management entity of MLD1 instructs STA4 to conduct related operations; in a case that STA4 is sending data to other STAs, after A-MPDU is sent and BA is received, if a sending TXOP of STA4 is still not over, data may be stopped being sent to other STAs until a sending TXOP of STA1 is over, or data may be sent to other STAs only after idle time longer than xIFS; and the xIFS is an inter-frame space between an end of an originally received BA frame and a frame starting to send A-MPDU, which is an SIFS of data that STA4 is sending to other STAs.

In SF-IFS after MLD2 sends a notice-to-send short frame, after other STAs (such as STA2) in MLD2 do not receive data that is sent from STA4 and to the STAs themselves, STA1 sends data (A-MPDU) to STA3; and if STA1 still sends data to STA3 in next time in TXOP, then it is unnecessary to send the notice-to-send short frame.

In the SF-IFS after MLD2 sends the notice-to-send short frame, STA2 receives data that is sent from STA4 and to STA2 itself, or a notice-to-send short frame, and STA1 stops sending data (A-MPDU) to STA3 until STA2 sends a BA frame.

Exemplary Embodiment 3

Figure 10:
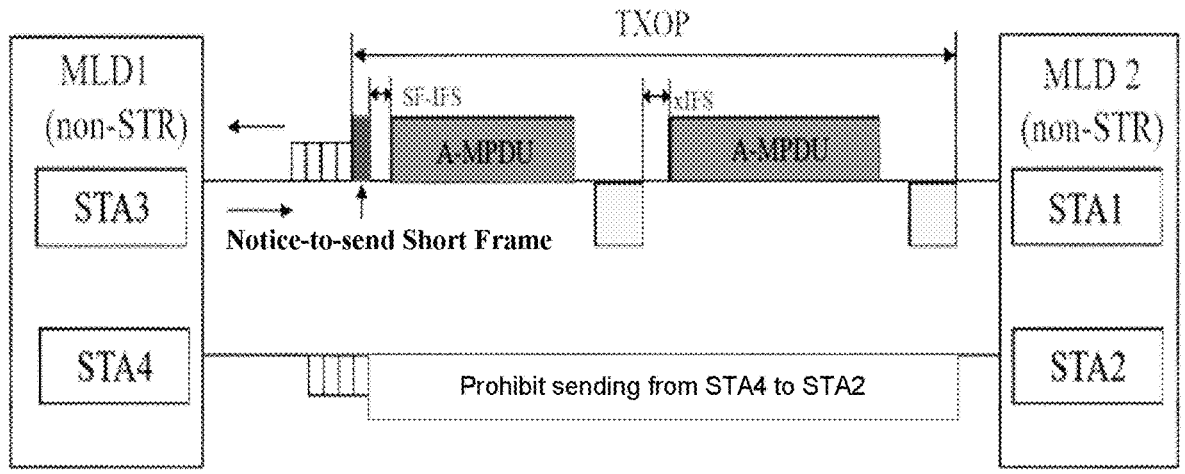
FIG. 10 is a schematic diagram (IV) of a scene of data transmission provided in an exemplary embodiment of the present disclosure.

In the exemplary embodiment, MLD of a sending side is a non-STR MLD, and MLD of a receiving side is a non-STR MLD. FIG. 10 is a schematic diagram (IV) of a scene of data transmission provided in an exemplary embodiment of the present disclosure. As shown in FIG. 10, a process of data transmission in a scene shown in the exemplary embodiment is specifically as follows:

When a TXOP is obtained, STA of a non-STR MLD (set as STA1) prepares to send data to a corresponding STA (set as STA3) in MLD1 if other STAs that have non-STR constraints on STA1 in MLD2 are not receiving data. To avoid STR in MLD2, it is necessary to send a notice-to-send short frame to STA3, ask MLD1 to send data to STA3 and indicate a duration of sending TXOP, which is obtained by STA1.

After STA3 receives a notice-to-send short frame sent from STA1, if one or more STAs (such as STA4) that have non-STR constraints on an "STA1-STA3" link in MLD1 are not sending data to other STAs (including STA2 in MLD2), then MLD1 instructs STA4 not to send data at a next TXOP moment. Specifically, the method may include the following steps that STA3 may inform a management entity of MLD1 that "STA1 of a link corresponding to STA3 will send data", and the management entity of MLD1 instructs STA4 to conduct related operations; when STA4 is sending data to other STAs, after A-MPDU is sent and BA is received, if a sending TXOP of STA4 is still not over, data may be stopped being sent to STA2 until a sending TXOP of STA1 is over, or data may be sent to other STAs only after idle time longer than xIFS; and the xIFS is an inter-frame space between an end of an originally received BA frame and a frame starting to send A-MPDU, which is an SIFS of data that STA4 is sending to other STAs.

In SF-IFS after MLD2 sends a notice-to-send short frame, after other STAs (such as STA2) that have non-STR constraints on STA1 in MLD2 do not receive the data sent to the STAs themselves, STA1 sends data (A-MPDU) to STA3; if STA1 still sends data to STA3 in next time in TXOP, then it is unnecessary to send a notice-to-send short frame; and if STA further sends data to STAs of other MLDs in next time in TXOP, then it is necessary to send the notice-to-send short frame to a corresponding target station first.

In the SF-IFS after MLD2 sends the "notice-to-send short frame", other STAs (such as STA2) that have non-STR constraints on STA1 in MLD2 are receiving data sent to the STAs themselves or a notice-to-send short frame, and STA1 stops sending data (A-MPDU) to STA3 until STA2 sends a BA frame.

Through the description of the above embodiments, those skilled in the art may clearly understand that the method according to the above embodiments may be realized by means of software and a necessary general hardware platform, and of course it may also be realized by hardware, but in many cases the former is a better embodiment. Based on such understanding, the technical solution of the present disclosure may be embodied in a form of a software product in essence or a part contributing to the prior art, and the computer software product is stored in a storage medium (such as a read only memory (ROM)/random access memory (RAM), a magnetic disk and an optical disk), and includes several instructions for enabling a terminal device (such as a mobile phone, a computer, a server or a network device) to perform the method of each embodiment of the present disclosure.

Figure 11:
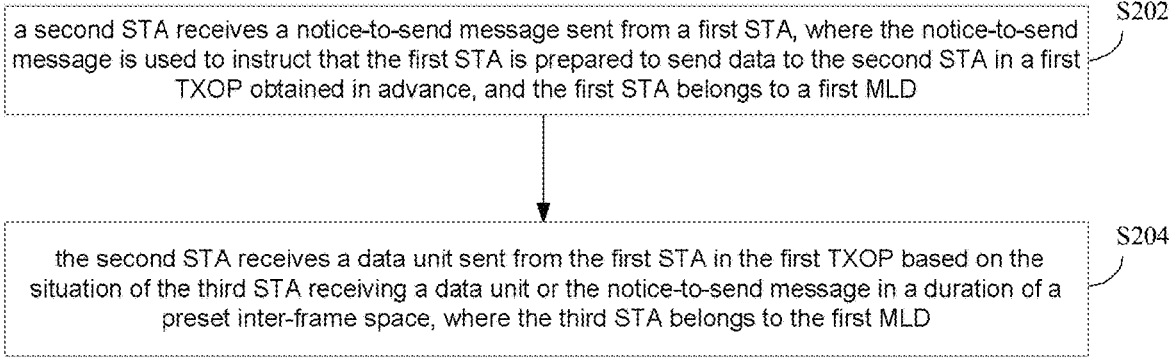
FIG. 11 is a flow diagram of a data receiving method provided in an embodiment of the present disclosure.

An embodiment of the present disclosure further provides the data receiving method, which is applied to a second STA. The second STA belongs to a second MLD. FIG. 11 is a flow diagram of the data receiving method provided in an embodiment of the present disclosure. As shown in FIG. 11, the data receiving method in the embodiment includes the following steps:

S202, the second STA receives a notice-to-send message sent from a first STA, where the notice-to-send message is used to instruct that the first STA is prepared to send data to the second STA in a first TXOP obtained in advance, and the first STA belongs to a first MLD; and S204, the second STA receives a data unit, which is sent from the first STA in the first TXOP based on the situation of the third STA receiving a data unit or the notice-to-send message in a duration of a preset inter-frame space, where the third STA belongs to the first MLD.

In an embodiment, in S204, the step that a data unit sent from the first STA in the first TXOP based on the situation of the third STA receiving a data unit or the notice-to-send message in a duration of a preset inter-frame space is received includes the following steps:

a data unit sent from the first STA in the first TXOP is received in a case that the first MLD is a non-STR MLD, the second MLD is an STR MLD, and the third STA does not receive a data unit or a notice-to-send message, a target address of which is the third STA, in the duration of the inter-frame space; or, a data unit sent from the first STA in the first TXOP is received in a case that the first MLD is an STR MLD, the second MLD is a non-STR MLD, and the third STA does not receive a data unit or a notice-to-send message sent from a fourth STA in the duration of the inter-frame space, where the fourth STA belongs to the second MLD; or, a data unit sent from the first STA in the first TXOP is received in a case that the first MLD is a non-STR MLD, the second MLD is a non-STR MLD, and the following conditions are met:

the third STA does not receive a data unit or a notice-to-send message, a target address of which is the third STA, in the duration of the inter-frame space, and the third STA does not receive a data unit or a notice-to-send message sent from the fourth STA in the duration of the inter-frame space.

In an embodiment, the notice-to-send message includes at least one of the following:

an MAC address of the first STA, an MAC address of the second STA, a frame type of the notice-to-send message, a first TXOP duration, a frame check sequence and STR instruction information of the first MLD, wherein the STR instruction information of the first MLD is used to instruct whether the first MLD is a two-link STR MLD or not.

In an embodiment, the first TXOP duration includes at least one of the following:

a duration for the first STA to send the notice-to-send message to the second STA; an SF-IFS; a duration for the first STA to send a data unit to the second STA; an SIFS after the data unit sent from the first STA; and a sending duration of an ACK packet instructing a data packet receiving and sending situation, wherein the SF-IFS is used to instruct the inter-frame space.

In an embodiment, the SF-IFS is determined according to the following objects:

a sending duration of the notice-to-send message between two STAs with a largest distance allowed, and a duration of processing the notice-to-send message by a MLD.

In an embodiment, the step that the notice-to-send message sent from the first STA is received includes the following steps:

the notice-to-send message sent from the first STA is received according to an MCS with a modulation order less than or equal to a preset modulation order threshold; and/or the notice-to-send message sent from the first STA is received according to a subcarrier band with anti-interference performance higher than or equal to a preset anti-interference threshold and/or an SNR larger than or equal to a preset SNR threshold.

In an embodiment, in S202, the step that the notice-to-send message sent from the first STA is received includes the following step:

the notice-to-send message sent from the first STA is received, so as to allow a management entity of the second MLD to instruct, according to the notice-to-send message, a fourth STA to stop sending a data unit to the first STA and/or the third STA in a preset duration, wherein the fourth STA belongs to the second MLD, and the preset duration is used to instruct a period corresponding to the first TXOP duration.

In an embodiment, in S202, the step that a management entity of the second MLD instructs, according to the notice-to-send message, a fourth STA to stop sending a data unit to the first STA and/or the third STA in a preset duration includes the following step:

the management entity of the second MLD instructs the fourth STA to perform the following operations in a case that the fourth STA is sending a data unit to the first STA and/or the third STA in a second TXOP:

a current data unit is sent to the first STA and/or the third STA, and a BA frame returned from the first STA and/or the third STA according to the data unit is received; and data is stopped being sent to the first STA and/or the third STA until an end of the first TXOP in a case that the second TXOP is not ended; or data is stopped being sent to the first STA and/or the third STA in a preset idle duration, where the idle duration is longer than or equal to an SIFS in data being sent from the fourth STA.

In an embodiment, at least one of the first MLD and the second MLD is a non-STR MLD.

It should be noted that embodiments and technical effects of the data receiving method in the embodiments of the present disclosure correspond to those of the data sending method described above, which are not repeated herein.

Through the description of the above embodiments, those skilled in the art may clearly understand that the method according to the above embodiments may be realized by means of software and a necessary general hardware platform, and of course it may also be realized by hardware, but in many cases the former is a better embodiment. Based on such understanding, the technical solution of the present disclosure may be embodied in a form of a software product in essence or a part contributing to the prior art, and the computer software product is stored in a storage medium (such as ROM/RAM, a magnetic disk and an optical disk), and includes several instructions for enabling a terminal device (such as a mobile phone, a computer, a server or a network device) to perform the method of each embodiment of the present disclosure.

An embodiment of the present disclosure further provides a data sending device, which is applied to a first STA. The first STA belongs to a first MLD. The device is configured to realize the embodiments and optional implementations described above, which have already been described and are not repeated herein. As used below, a term "module" may be a combination of software and/or hardware that implements a predetermined function. Although the device described in the following embodiments is preferably implemented by software, implementation of hardware, or a combination of software and hardware, is also possible and conceived.

Figure 12:
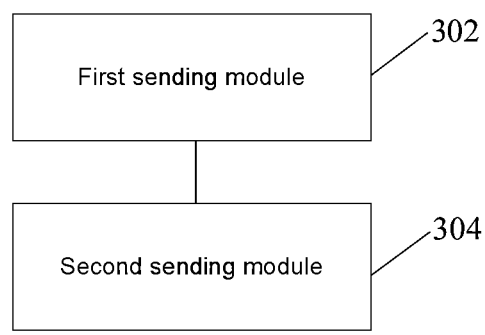
FIG. 12 is a structure block diagram of a data sending device provided in an embodiment of the present disclosure.

FIG. 12 is a structure block diagram of a data sending device provided in an embodiment of the present disclosure. As shown in FIG. 12, the data sending device in the embodiment includes:
- a first sending module 302 configured to send a notice-to-send message to a second STA, where the notice-to-send message is used to instruct that the first STA is prepared to send a data unit to the second STA in a first TXOP obtained in advance, and the second STA belongs to a second MLD; and
- a second sending module 304 configured to perform the following operations based on the situation of the third STA receiving a data unit or the notice-to-send message in a duration of a preset inter-frame space: a data unit is sent to the second STA in the first TXOP, or a data unit is stopped being sent to the second STA, wherein the third STA belongs to the first MLD.

It should be noted that embodiments and technical effects of the data sending device in the embodiments of the present disclosure correspond to those of the data sending method described above, which are not repeated herein.

It should be noted that the various modules described above may be realized by software or hardware, realization by hardware may be implemented as follows but are not limited thereto: the modules described above are located in the same processor; or the modules described above are separately located in different processors in any combination form.

An embodiment of the present disclosure further provides a data receiving device, which is applied to a second STA. The second STA belongs to a second MLD. The device is configured to realize the embodiments and optional implementations described above, which have already been described and are not repeated herein. As used below, a term "module" may be a combination of software and/or hardware that implements a predetermined function. Although the device described in the following embodiments is preferably implemented by software, implementation of hardware, or a combination of software and hardware, is also possible and conceived.

Figure 13:
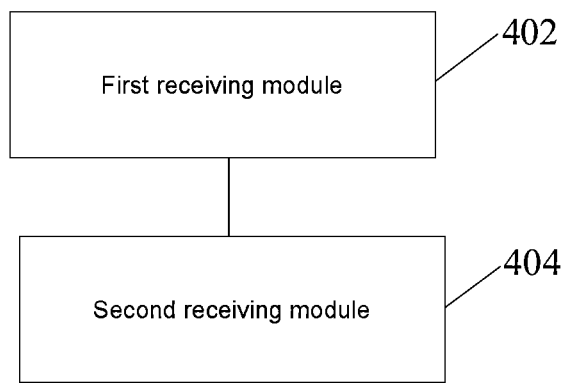
FIG. 13 is a structure block diagram of a data receiving device provided in an embodiment of the present disclosure.

FIG. 13 is a structure block diagram of a data receiving device provided in an embodiment of the present disclosure. As shown in FIG. 13, the data receiving device in the embodiment includes:
- a first receiving module 402 configured to receive a notice-to-send message sent from a first STA, where the notice-to-send message is used to instruct that the first STA is prepared to send data to the second STA in a first TXOP obtained in advance, and the first STA belongs to a first MLD; and
- a second receiving module 404 configured to receive a data unit sent from the first STA in the first TXOP in the case that the third STA receives a data unit or the notice-to-send message in a duration of a preset inter-frame space, where the third STA belongs to the first MLD.

It should be noted that embodiments and technical effects of the data receiving device in the embodiments of the present disclosure correspond to those of the data sending method described above, which are not repeated herein.

It should be noted that the various modules described above may be realized by software or hardware, realization by hardware may be implemented as follows but are not limited thereto: the modules described above are located in the same processor; or the modules described above are separately located in different processors in any combination form.

An embodiment of the present disclosure further provides a computer readable storage medium, which stores a computer program, where the computer program is configured to perform the steps of any one of the method embodiments described above at runtime.

In an exemplary embodiment, the computer readable storage medium described above may include, but is not limited to, a universal serial bus (USB) flash disk, ROM, RAM, a mobile hard disk, a magnetic disk, an optical disk, and various media that may store computer programs.

An embodiment of the present disclosure further provides an electronic device, which includes a memory and a processor, where the memory stores a computer program, and the processor is configured to run a computer program to perform the steps of any one of the method embodiments described above.

In an exemplary embodiment, the electronic device described above may further include a transmission device and an input/output device, where the transmission device is connected to the processor described above and the input/output device is connected to the processor described above.

Specific examples in the embodiment may be referred to the examples described in the embodiments and exemplary implementations described above, which are not described in detail herein.

Obviously, those skilled in the art will appreciate that the modules or steps of the embodiments of the present disclosure described above may be realized with a general-purpose computation device, and may be centralized on a single computation device or distributed on a network composed of a plurality of computation devices, they may be realized with program codes executable by the computation device, such that they may be stored in a storage device to be executed by the computation device, and under some conditions, the steps shown or described may be executed in an order different from that herein, or they may be fabricated separately as individual integrated circuit modules, or a plurality of modules or steps of them may be fabricated as a single integrated circuit module for realization. Thus, the present disclosure is not limited to any particular combination of hardware and software.

The above is merely the embodiments of the present disclosure and is not intended to limit the present disclosure, and various changes and modifications of the present disclosure may be made by those skilled in the art. Any modifications, equivalent replacements, improvements, etc. made within the principles of the present disclosure should fall within the scope of protection of the present disclosure.

What is claimed is:

1. A data sending method, being applied to a first station (STA), wherein the first STA belongs to a first multi-link device (MLD), and the method comprises:
    sending a notice-to-send message to a second STA, wherein the notice-to-send message is used to instruct that the first STA is prepared to send a data unit to the second STA in a first transmission opportunity (TXOP) obtained in advance, and the second STA belongs to a second MLD; and
    performing the following operations based on a situation of a third STA receiving a data unit or the notice-to-send message in a duration of a preset inter-frame space:
    sending a data unit to the second STA in the first TXOP, or stopping sending a data unit to the second STA; wherein the third STA belongs to the first MLD;
    wherein the notice-to-send message at least comprises a first TXOP duration, the first TXOP duration at least comprises a short frame inter-frame space (SF-IFS), wherein the SF-IFS is determined according to the following objects:
    a sending duration of the notice-to-send message between two STAs with a largest distance allowed, and a duration of processing the notice-to-send message by a MLD.

2. The method according to claim 1, wherein the notice-to-send message comprises at least one of the following: a media access control (MAC) address of the first STA, an MAC address of the second STA, a frame type of the notice-to-send message, a frame check sequence, and STR instruction information of the first MLD;
    wherein the STR instruction information of the first MLD is used to instruct whether the first MLD is an STR MLD or not.

3. The method according to claim 2, wherein the first TXOP duration comprises at least one of the following: a duration for the first STA to send the notice-to-send message to the second STA; a duration for the first STA to send a data unit to the second STA; a short inter-frame space (SIFS) after the data unit sent from the first STA; and a sending duration of an ACK packet instructing a data packet receiving and sending situation,
    wherein the SF-IFS is used to instruct the inter-frame space.

4. The method according to claim 1, wherein sending a notice-to-send message to a second STA comprises:
    sending the notice-to-send message to the second STA according to a modulation and coding scheme (MCS) with a modulation order less than or equal to a preset modulation order threshold; and/or
    sending the notice-to-send message to the second STA by means of a subcarrier band with anti-interference performance higher than or equal to a preset anti-interference threshold and/or a signal-to-noise ratio (SNR) larger than or equal to a preset SNR threshold.

5. The method according to claim 2, wherein sending a notice-to-send message to a second STA comprises:
    sending the notice-to-send message to the second STA, so as to allow a management entity of the second MLD to instruct, according to the notice-to-send message, a fourth STA to stop sending a data unit to the first STA and/or the third STA in a preset duration;
    wherein the fourth STA belongs to the second MLD, and the preset duration is used to instruct a period corresponding to the first TXOP duration.

6. The method according to claim 5, wherein the management entity of the second MLD instruct, according to the notice-to-send message, a fourth STA to stop sending a data unit to the first STA and/or the third STA in a preset duration comprises:
    instructing, by the management entity of the second MLD, the fourth STA to perform the following operations in a case that the fourth STA is sending a data unit to the first STA and/or the third STA in a second TXOP:
    sending a current data unit to the first STA and/or the third STA, and receiving a block acknowledgement (BA) frame returned from the first STA and/or the third STA according to the data unit; and
    stopping sending data to the first STA and/or the third STA until an end of the first TXOP in a case that the second TXOP is not ended; or stopping sending data to the first STA and/or the third STA in a preset idle duration, wherein the idle duration is longer than or equal to an SIFS in data being sent from the fourth STA.

7. The method according to claim 1, wherein at least one of the first MLD and the second MLD is a non-STR MLD.

8. The method according to claim 1, wherein performing the following operations based on the situation of the third STA receiving a data unit or the notice-to-send message in a duration of a preset inter-frame space: sending a data unit to the second STA in the first TXOP, or stopping sending a data unit to the second STA comprises:
    sending, by the first STA, data to the second STA in the first TXOP in a case that the first MLD is a non-synchronous transmit receive (STR) MLD, the second MLD is an STR MLD, and the third STA does not receive a data unit or a notice-to-send message, a target address of which is the third STA, in the duration of the inter-frame space; or,
    sending, by the first STA, data to the second STA in the first TXOP in a case that the first MLD is an STR MLD, the second MLD is a non-STR MLD, and the third STA does not receive a data unit or a notice-to-send message sent from a fourth STA in the duration of the inter-frame space, wherein the fourth STA belongs to the second MLD;
    or, sending, by the first STA, data to the second STA in the first TXOP in a case that the first MLD is a non-STR MLD, the second MLD is a non-STR MLD, and the following conditions are met:
    the third STA does not receive a data unit or a notice-to-send message, a target address of which is the third STA, in the duration of the inter-frame space, and the third STA does not receive a data unit or a notice-to-send message sent from the fourth STA in the duration of the inter-frame space.

9. The method according to claim 8, wherein performing the following operations based on the situation of the third STA receiving a data unit or the notice-to-send message in a duration of a preset inter-frame space: sending a data unit to the second STA in the first TXOP, or stopping sending a data unit to the second STA further comprises:
  stopping sending, by the first STA, a data unit to the second STA in a case that the first MLD is a non-STR MLD, and the third STA receives a data unit or a notice-to-send message, a target address of which is the third STA, in the duration of the inter-frame space, and/or, resending, by the first STA, the notice-to-send message to the second STA after the third STA returns an acknowledgement (ACK) frame; or,
  stopping sending, by the first STA, a data unit to the second STA in a case that the second MLD is a non-STR MLD, and the third STA receives a data unit or a notice-to-send message sent from the fourth STA in the duration of the inter-frame space, and/or, resending, by the first STA, the notice-to-send message to the second STA after the third STA returns an ACK frame.

10. A data receiving method, being applied to a second STA, wherein the second STA belongs to a second MLD, and the method comprises:
  receiving a notice-to-send message sent from a first STA, wherein the notice-to-send message is used to instruct that the first STA is prepared to send data to the second STA in a first TXOP obtained in advance, and the first STA belongs to a first MLD; and
  receiving a data unit sent from the first STA in the first TXOP in the case that a third STA receives a data unit or the notice-to-send message in a duration of a preset inter-frame space, wherein the third STA belongs to the first MLD;
  wherein the notice-to-send message at least comprises a first TXOP duration, the first TXOP duration at least comprises a short frame inter-frame space (SF-IFS), wherein the SF-IFS is determined according to the following objects:
    a sending duration of the notice-to-send message between two STAs with a largest distance allowed, and a duration of processing the notice-to-send message by a MLD.

11. The method according to claim 10, wherein the notice-to-send message comprises at least one of the following: an MAC address of the first STA, an MAC address of the second STA, a frame type of the notice-to-send message, a frame check sequence and STR instruction information of the first MLD;
  wherein the STR instruction information of the first MLD is used to instruct whether the first MLD is a two-link STR MLD or not.

12. The method according to claim 11, wherein the first TXOP duration comprises at least one of the following: a duration for the first STA to send the notice-to-send message to the second STA; a duration for the first STA to send a data unit to the second STA; an SIFS after the data unit sent from the first STA; and a sending duration of an ACK packet instructing a data packet receiving and sending situation;
  wherein the SF-IFS is used to instruct the inter-frame space.

13. The method according to claim 10, wherein receiving a notice-to-send message sent from a first STA comprises:
  receiving the notice-to-send message sent from the first STA according to an MCS with a modulation order less than or equal to a preset modulation order threshold; and/or
  receiving the notice-to-send message sent from the first STA by means of a subcarrier band with anti-interference performance higher than or equal to a preset anti-interference threshold and/or an SNR larger than or equal to a preset SNR threshold.

14. The method according to claim 11, wherein receiving a notice-to-send message sent from a first STA comprises:
  receiving the notice-to-send message sent from the first STA, so as to allow a management entity of the second MLD to instruct, according to the notice-to-send message, a fourth STA to stop sending a data unit to the first STA and/or the third STA in a preset duration,
  wherein the fourth STA belongs to the second MLD, and the preset duration is used to instruct a period corresponding to the first TXOP duration.

15. The method according to claim 14, wherein the allowing a management entity of the second MLD to instruct, according to the notice-to-send message, a fourth STA to stop sending a data unit to the first STA and/or the third STA in a preset duration comprises:
  instructing, by the management entity of the second MLD, the fourth STA to perform the following operations in a case that the fourth STA is sending a data unit to the first STA and/or the third STA in a second TXOP:
  sending a current data unit to the first STA and/or the third STA, and receiving a BA frame returned from the first STA and/or the third STA according to the data unit; and
  stopping sending data to the first STA and/or the third STA until an end of the first TXOP in a case that the second TXOP is not ended; or stopping sending data to the first STA and/or the third STA in a preset idle duration, wherein the idle duration is longer than or equal to an SIFS in data being sent from the fourth STA.

16. The method according to claim 10, wherein at least one of the first MLD and the second MLD is a non-STR MLD.

17. The method according to claim 10, wherein receiving a data unit sent from the first STA in the first TXOP in the case that the third STA receives a data unit or the notice-to-send message in a duration of a preset inter-frame space comprises:
  receiving a data unit sent from the first STA in the first TXOP in a case that the first MLD is a non-STR MLD, the second MLD is an STR MLD, and the third STA does not receive a data unit or a notice-to-send message, a target address of which is the third STA, in the duration of the inter-frame space; or,
  receiving a data unit sent from the first STA in the first TXOP in a case that the first MLD is an STR MLD, the second MLD is a non-STR MLD, and the third STA does not receive a data unit or a notice-to-send message sent from a fourth STA in the duration of the inter-frame space, wherein the fourth STA belongs to the second MLD; or,
  receiving a data unit sent from the first STA in the first TXOP in a case that the first MLD is a non-STR MLD, the second MLD is a non-STR MLD, and the following conditions are met: the third STA does not receive a data unit or a notice-to-send message, a target address of which is the third STA, in the duration of the inter-frame space, and the third STA does not receive a data unit or a notice-to-send message sent from the fourth STA in the duration of the inter-frame space.

18. A data sending device, being applied to a first STA, wherein the first STA belongs to a first MLD, and the device comprises:

a first sending module, configured to send a notice-to-send message to a second STA, wherein the notice-to-send message is used to instruct that the first STA is prepared to send a data unit to the second STA in a first TXOP obtained in advance, and the second STA belongs to a second MLD; and a second sending module, configured to perform the following operations based on the situation of a third STA receiving a data unit or the notice-to-send message in a duration of a preset inter-frame space: sending a data unit to the second STA in the first TXOP, or stopping sending a data unit to the second STA, wherein the third STA belongs to the first MLD;

wherein the notice-to-send message at least comprises a first TXOP duration, the first TXOP duration at least comprises a short frame inter-frame space (SF-IFS), wherein the SF-IFS is determined according to the following objects:

a sending duration of the notice-to-send message between two STAs with a largest distance allowed, and a duration of processing the notice-to-send message by a MLD.

* * * * *